United States Patent
Yates et al.

(10) Patent No.: US 11,010,563 B2
(45) Date of Patent: May 18, 2021

(54) NATURAL LANGUAGE PROCESSING AND MACHINE LEARNING FOR PERSONALIZED TASKS EXPERIENCE

(71) Applicant: Microsoft Technology Licensing, LLC, Redmond, WA (US)

(72) Inventors: Timothy Alexander Yates, Berlin (DE); Antonio José Consuegra Berruezo, Saló (IT); Bernd Ingo Plontsch, Berlin (DE); Iurii Kondratiuk, Berlin (DE); Manjot Singh Pal, Seattle, WA (US); Selina Wang, New York City, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 109 days.

(21) Appl. No.: 16/414,179

(22) Filed: May 16, 2019

(65) Prior Publication Data
US 2020/0364305 A1    Nov. 19, 2020

(51) Int. Cl.
*G06F 40/30* (2020.01)
*G06N 20/00* (2019.01)
*G06F 3/0482* (2013.01)
*H04L 12/58* (2006.01)

(52) U.S. Cl.
CPC ............ *G06F 40/30* (2020.01); *G06F 3/0482* (2013.01); *G06N 20/00* (2019.01); *H04L 51/046* (2013.01)

(58) Field of Classification Search
None
See application file for complete search history.

(56) References Cited

U.S. PATENT DOCUMENTS

| | | | |
|---|---|---|---|
| 8,700,997 B1 * | 4/2014 | Yang | G06F 40/263 715/257 |
| 2016/0086116 A1 | 3/2016 | Mittal et al. | |
| 2016/0224946 A1 | 8/2016 | Vemuri et al. | |
| 2018/0123997 A1 | 5/2018 | Celedonia et al. | |
| 2019/0340013 A1 * | 11/2019 | Cella | G06Q 30/0206 |

FOREIGN PATENT DOCUMENTS

| | | |
|---|---|---|
| WO | 2017003977 A1 | 1/2017 |
| WO | 2017205036 A1 | 11/2017 |

OTHER PUBLICATIONS

Corston-Oliver, et al., "Task-Focused Summarization of Email", In ACL-04 Workshop: Text Summarization Branches Out, Jan. 1, 2004, 8 Pages.
"International Search Report and Written Opinion Issued in PCT Application No. PCT/US20/028035", dated Jul. 31, 2020, 14 Pages.

* cited by examiner

*Primary Examiner* — Quynh H Nguyen (57) ABSTRACT

In non-limiting examples of the present disclosure, systems, methods and devices for assisting with task completion are provided. A natural language input may be received. A natural language processing engine may be applied to the natural language input. A primary task associated with the natural language input may be identified. A plurality of subtasks for completing the primary task may be identified from the natural language input. A determination may be made from the natural language input that the primary task or one of the plurality of subtasks is more important than other tasks. The primary task and the plurality of subtasks may be added to a list of tasks in a task completion application. An indication of importance may be associated in the task completion application in association with the task or subtask that is determined to be more important.

17 Claims, 10 Drawing Sheets

NATURAL LANGUAGE PROCESSING AND MACHINE LEARNING FOR PERSONALIZED TASKS EXPERIENCE

BACKGROUND

As computers have become ubiquitous in everyday life, so to has their use in making users' lives more productive. To-do lists are one of the key tools that experts identify as being integral in being productive and accomplishing goals. However, because to-do lists on computers are generally populated via manual input, inputting tasks can be counterproductive to the goal of being more efficient with users' time. Automation of task population is desired. However, it is difficult to accurately capture the importance of tasks, organization of those tasks, and the identification of shortest paths for task completion.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for assisting with task completion. A task completion application and/or a service associated with the task completion application may automatically import tasks that have been identified from natural language inputs received from other applications (e.g., email applications, instant messaging applications, etc.) and/or from natural language inputs provided directly to the task completion application. In some examples, a task or task intent associated with a natural language input may be identified via application of one or more natural language processing models to the natural language input. In additional examples, one of the natural language processing models applied to an input may identify whether there are subtasks associated with the task. Any identified tasks and/or subtasks may then be imported into a relevant task list in the task completion application. In additional examples, a machine learning model may be applied to the natural language inputs to identify relative importance of identified tasks based on input characteristics that are specific to each user. Tasks that are identified as being important and/or reminders associated with those tasks can then be surfaced in the task completion application in a manner that efficiently triages the important tasks.

BRIEF DESCRIPTION OF THE DRAWINGS

Non-limiting and non-exhaustive examples are described with reference to the following figures.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for assisting with task completion. Task completion is made easier by providing mechanisms for automatically populating a to-do list with tasks and subtasks that have been identified via natural language processing and/or by identifying important tasks included in natural language inputs so that they can be included in a task completion application in a different manner than more unimportant tasks. The more important tasks and/or reminders associated with the more important tasks can be surfaced in a manner that makes their completion more efficient and effective than if they were simply included as normal tasks in a to-do list.

According to examples, a primary task and/or one or more subtasks of a primary task may be identified from a natural language input. In some examples, the natural language input may be received directly via an input into a task completion application. In other examples, the natural language input may be provided to a different application (e.g., an instant messaging application, an email application, a digital assistant, etc.) and subsequently passed to a task completion application. For example, a user may utilize privacy settings associated with the task completion application and/or one or more of the other applications and specifically allow the task completion application to retrieve messages from those other applications, or allow the other applications to push messages to the task completion application. Once the natural language input is received, it may be processed to identify one or more tasks and/or subtasks. The processing of the natural language input may comprise application of one or more natural language processing models to the natural language input. In some examples, a first layer of processing applied to the natural language input may comprise application of a relatively inexpensive processing model to the natural language input to identify whether the natural language input includes a task (i.e., identify a task intent associated with the natural language input). If the natural language input is determined to include a task, a second layer of processing may be applied to the natural language input to identify one or more attributes associated with the task and/or to identify one or more subtasks included in the natural language input.

In still additional examples, one or more machine learning models may be applied to the natural language input and/or elements of the natural language input to identify whether a user associates a relatively higher level of importance with a task or subtask included therein when compared with other tasks and/or subtasks. For example, a machine learning model that has been trained on past user inputs (from the user that authored the natural language input and/or from other users) may be applied to a natural language input to determine whether certain characteristics of the natural language input indicate a higher level of importance related to an identified task and/or subtask. Examples of these characteristics/elements include: underlining of tasks, bolding of tasks, exclamation marks following tasks, starring of tasks, circling of tasks, and highlighting tasks. Other characteristics/elements associated with task importance may be determined and identified via application of one or more machine learning models based on other patterns identified in natural language inputs generated by users.

The systems, methods, and devices described herein provide technical advantages for assisting with task completion. Processing resources (i.e., CPU cycles) associated with populating task lists may be reduced via application of the mechanisms described herein by allowing a task completion application to automatically identify tasks and subtasks from natural language inputs from various applications and pull them into new or existing task lists rather than making a user open each of those other applications separately, copy any tasks included in messages of those applications, and paste them into relevant task lists in the task completion application. Processing resources are further reduced via application of a two-layered processing model whereby natural language inputs are first processed with a "cheap" processing model to identify whether those inputs include a task, and only when a task is positively identified, processing the corresponding inputs with a second layer of one or more "expensive" processing models to identify attributes associated with an identified task. Efficiency and user experience are also improved upon by the examples described herein by automatically identifying relatively important tasks included in natural language inputs. That is, rather than making users manually specify which tasks are important to them, the machine learning models described herein can analyze the language already generated by users and automatically identify tasks that are important to them. Those important tasks and/or reminders associated with those important tasks can then be surfaced in a task completion application in a manner that makes triaging of tasks relative to their importance more efficient.

Figure 1:
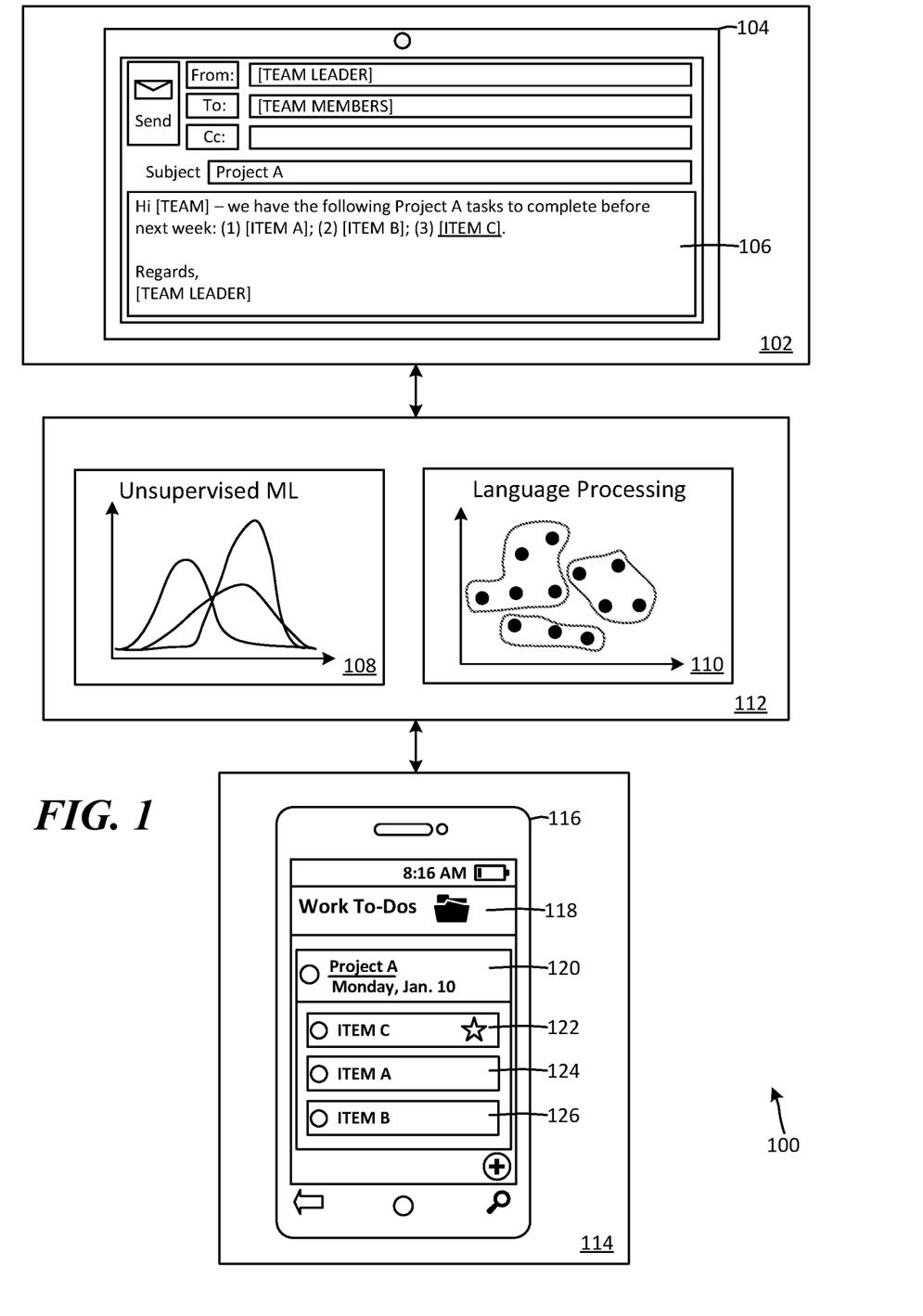
FIG. 1 is a schematic diagram illustrating an example distributed computing environment for assisting with task completion utilizing artificial intelligence in association with a task completion application.

FIG. 1 is a schematic diagram illustrating an example distributed computing environment 100 for assisting with task completion utilizing artificial intelligence in association with a task completion application. Distributed computing environment 100 includes natural language input sub-environment 102, input processing sub-environment 112 and task completion output sub-environment 114. Any and all of the devices shown in FIG. 1 may communicate with one another via a wired or wireless network.

Natural language input sub-environment 102 includes computing device 104 on which a user ("TEAM LEADER") has drafted email 106. The email 106 from [TEAM LEADER] to [TEAM MEMBERS] has "Project A" in the subject field, and the body states: "Hi [TEAM]—we have the following Project A tasks to complete before next week: (1) [ITEM A]; (2) [ITEM B]; (3) [ITEM C]. Regards, [TEAM LEADER]." Although this message is illustrated as being composed as an email, in other examples the systems, methods and devices described herein may be applied to other natural language input types (e.g., text message, direct task completion application input, digital assistant input, a speech-to-text input, etc.). In this example, a user associated with the message (e.g., the team leader or one of the team members) has a task completion application running on her mobile device (i.e., mobile computing deice 114) as illustrated by task completion output sub-environment 114. In some examples, the task completion application may be executed entirely on mobile computing device 116. In other examples, the task completion application may be executed entirely on one or more remote computing devices, such as a server computing device as part of a task completion service that operates in the cloud. In still other examples, the task completion application may be executed partially on mobile computing device 116 and partially on one or more remote computing devices.

A user associated with the task completion application running on mobile computing device 116 may authorize the task completion application to retrieve messages associated with one or more other applications and/or services that the user is associated with. For example, the user associated with the task completion application may use a single user credential to access an application suite including one or more of: the task completion application, an email application (e.g., the email application utilized to send or receive email 106), a direct messaging application, a meeting application, a notes application, a presentation application, etc. The user may either authorize the task completion application to proactively retrieve messages from those other applications and/or the user may authorize those other applications to automatically send their associated messages to the task completion application.

Once the task completion application and/or task completion application service receives a message such as email 106, it may process that message with a natural language processing engine and/or one or more machine learning models. In some examples, the task completion application may first apply a first, coarse, natural language processing engine to the message to determine whether the message includes a task. The coarse natural language processing engine may be coarse in that its processing costs are relatively low. In some examples, once the coarse natural language processing engine has positively determine that there is a task included in the message, a second, finer, natural language processing engine may be applied to one or more fields of the message (e.g., "subject" field, "from" field, "to" field, "cc" field, body field, etc.). The finer natural language processing engine may require more processing resources than the coarse natural language processing engine. However, the finer natural language processing engine may be utilized to identify additional attributes of the message, including one or more of: what user(s) are responsible for completing the task; whether there are other users associated with completion of the task; a due date associated with the task; a time that the task is supposed to start and/or be started; and/or whether the task has one or more subtasks associated with it.

In some examples, the additional attributes identified via application of the finer natural language processing engine may be utilized by the task completion application in combination with one or more other resources to make task completion more efficient. For example, if the finer natural language processing engine identifies a time (e.g., 10:30 am) associated with a task (e.g., "call mom"), the task completion application may prompt an associated user to complete the task (call mom) utilizing specific information tailored based on that information (e.g., call mom at her work number rather than at her home number as she is likely at work at that time). Thus, the task completion application may surface useful content from the other resources (e.g., contacts application, calendar application, etc.) according to the information obtained via application of the finer natural language processing engine.

In examples where the coarse natural language processing engine is utilized to identify attributes of the message (e.g., persons, places, things and/or times relevant to task completion), the finer natural language processing engine may be utilized to weed out false positives from those attributes. That is in some examples, the more cost intensive language processing engine may identify that attributes are related to task completion to a higher degree of certainty than the less cost intensive natural language processing engine.

According to some examples, the coarse level processing may comprise processing of a received natural language input utilizing a hierarchical attention model, and the finer level processing may comprise a conditional random field model, with long short-term feature extractors. In additional examples, one or more of the following may be applied to a received natural language input in performing coarse and/or fine-grained processing of a natural language input to assist with task completion: topic detection using clustering, hidden Markov models, maximum entropy Markov models, support vector machine models, decision tree models, deep neural network models, general sequence-to-sequence models (e.g., conditional probability recurrent neural networks, transformer networks), generative models, recurrent neural networks for feature extractors (e.g., long short-term memory models, GRU models), deep neural network models for word-by-word classification, and latent variable graphical models). The application of one or both of these natural language processing models is illustrated by language processing element 110 in input processing sub-environment 112.

In this example, the language processing engines identify that there is a primary task associated with email 106 (i.e., "Project A"), and that there are three subtasks associated with email 106 (i.e., [ITEM A], [ITEM B], [ITEM C]). In some examples, the subtasks may be identified as subtasks based on being included in a numbered and/or bulleted list. In other examples, the subtasks may be identified as subtasks based on their values being separated by delimiters in a string. In additional examples, the subtasks may be identified as subtasks based on a combination of being identified as members of a string separated by delimiters and being included in a numbered and/or bulleted list.

In examples, the task completion application may have different mechanisms for surfacing and/or providing information associated with tasks that are deemed "important" by users and tasks that are not deemed "important" by users.

For example, the task completion application may display the important tasks in a more prominent manner than the less important tasks, provide more frequent and/or more noticeable reminders to complete the important tasks, etc. In some examples, the determination of whether tasks are important to a user may be automatically determined via analysis of a natural language input such as email 106. This is illustrated by unsupervised machine learning element 108. Specifically, one or more machine learning models may be applied to a user's natural language input to determine whether a task and/or a subtask included therein is likely more important than other tasks or subtasks included in the natural language input and/or other tasks that have been previously added to the user's task list in the task completion application. A machine learning model may be trained on user data for a specific user, and/or data from other users, to determine whether certain identified tasks and/or subtasks are important based on various inputs, symbols and/or highlights around them. In the illustrated example, email 106 includes an underlining of "[ITEM C]", and that underlining has been identified as indicating for the specific user in question that the subtask corresponding to [ITEM C] is therefore more important than the other subtasks included in email 106. The machine learning model may identify task importance by other features associated with tasks and subtasks (e.g., bolding, highlighting, starring, all caps, etc.). In additional examples, the machine learning model may utilize a user feedback loop such that when it correctly identifies important tasks for a user, the user may positively indicate that correct identification, and when it incorrectly identifies tasks as being important, the user may negatively indicate that incorrect identification. The machine learning model may then take that feedback into account when it makes subsequent determinations of task and subtask importance.

As illustrated by the user interface on mobile computing device 116, the identified task (Project A) from email 106 has been imported into the user's task completion application, and specifically the user's Work To-Dos. This is illustrated by Project A element 120. The task completion application has also identified via one or more of the natural language processing engines that there is a due date for completing Project A of Monday, January 10, and that due date has been added for the task in the task completion application as well. The subtasks that have been identified from email 106 have also been added to the user's task completion application under their corresponding primary task. The subtask for [ITEM C] has a corresponding element 122 on the user interface that is associated with a star, which indicates that it is more important than the other subtasks. That element 122 is also displayed above element 124 corresponding to the [ITEM A] subtask and element 126 corresponding to the [ITEM B] subtask.

Figure 2:
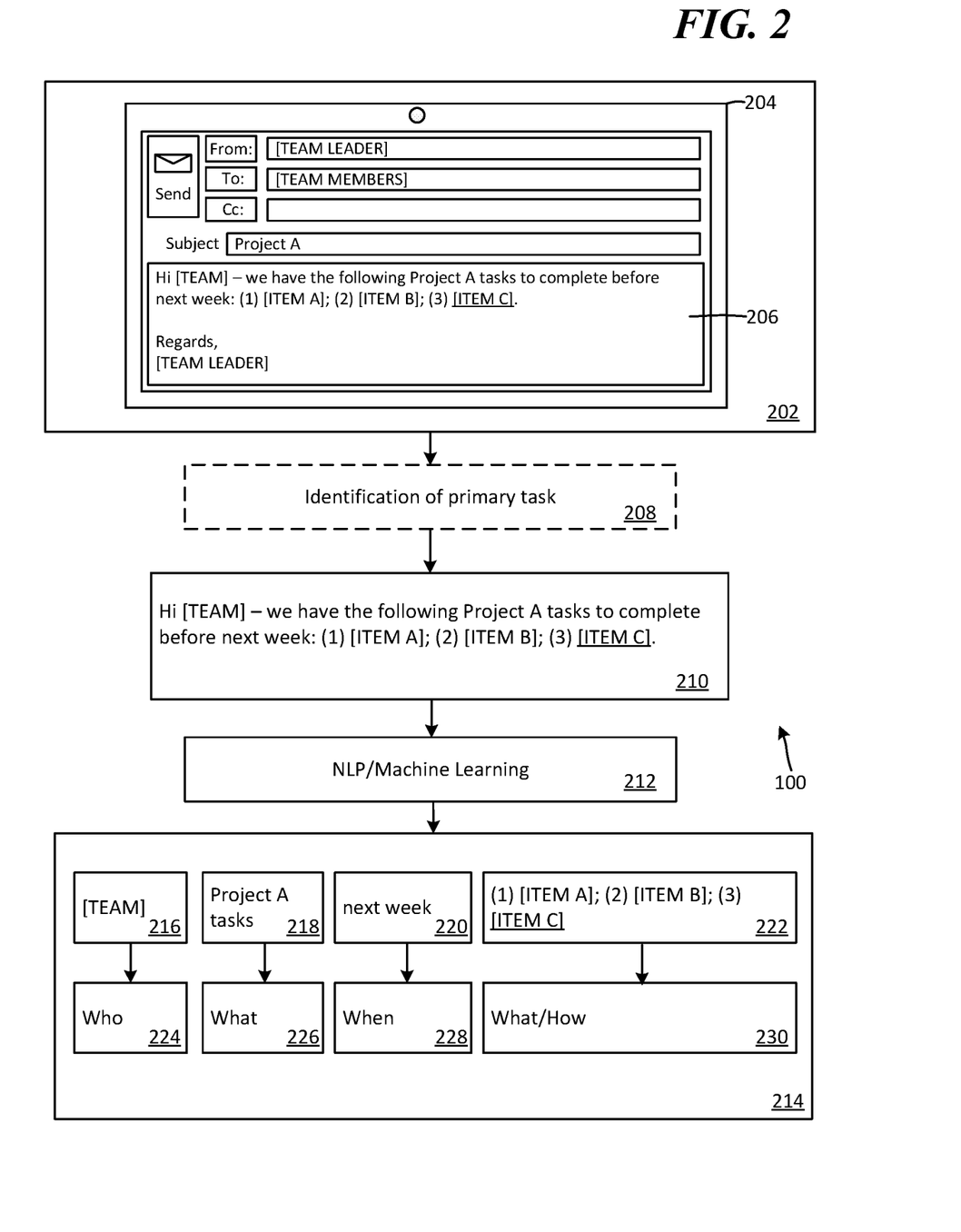
FIG. 2 illustrates the utilization of a natural language processing engine to identify and tag distinct pieces of a natural language input that are related to task completion.

FIG. 2 illustrates an environment 200 for the utilization of a natural language processing engine to identify and tag distinct pieces of a natural language input that are related to task completion. Email 206 has been drafted on computing device 204 in natural language input sub-environment 202. That email is the same message that was discussed in reference to FIG. 1.

In this example, a first level natural language processing engine (e.g., a coarse processing engine) may analyze email 206 and make a determination of whether language in that email and/or language associated with one or more fields of that email indicate that there is a primary task included in email 206. This processing is illustrated by primary task identification element 208. In other examples, the identification of a primary task may be made at natural language process/machine learning element 212. Thus, in some examples, only a single natural language processing model may be applied to the natural language input. However, by first performing a coarse processing of a message as illustrated by primary task identification element 208, a smaller amount of processing resources can be expended by only passing messages that are positively identified as including a primary task for additional, more cost-intensive processing.

In this example, once identification of the primary task has been made (i.e., identification of "Project A"), the task completion application passes the natural language input 210 from the body of email 206 for finer processing via natural language processing/machine learning element 212. As shown by attribute identification sub-environment 214, the natural language processing engine applied at natural language processing/machine learning element 212 has identified "[TEAM]" 216 from the text as the "Who" 224 the task relates to, "Project A tasks" 218 as the "What" 226 the primary task is, "next week" 220 as the "When" 228 the task needs to be completed, and the subtasks "(1) [ITEM A]; (2) [ITEM B]; (3) [ITEM C]" as the "What/How" 230 the primary task is going to be completed. The machine learning applied at natural language processing/machine learning element 212 may have also identified the underlining of "[ITEM C]" as being more important than the other subtasks included in email 206. For example, a machine learning model applied to past user inputs for the user that drafted email 206 may indicate that the user indicates that tasks/sub-tasks are important by underlining them.

Figure 3:
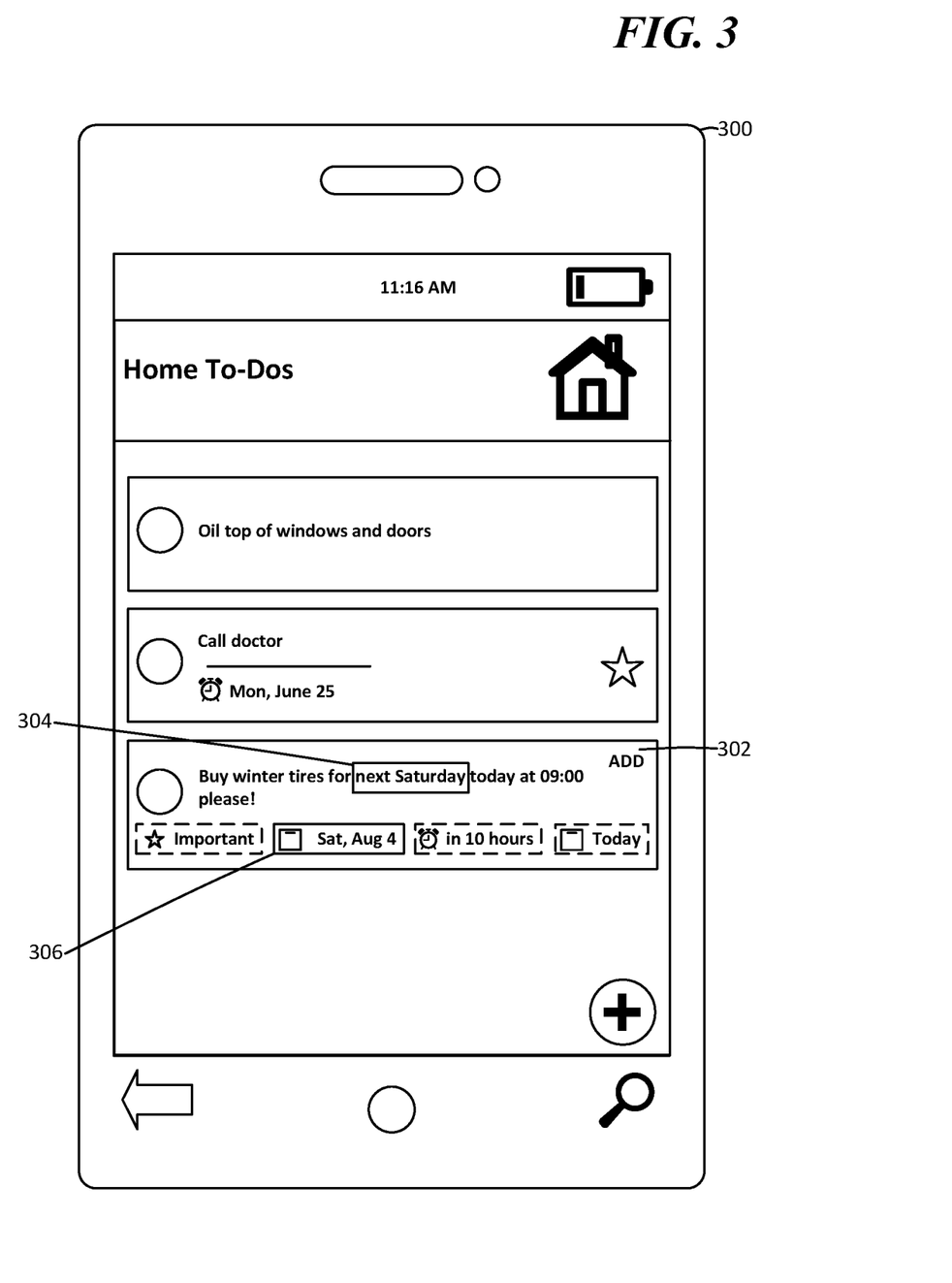
FIG. 3 illustrates the identification of a calendar date element related to task completion from a natural language input and an associated surfacing of that identification via a task completion application.

FIG. 3 illustrates the identification of a calendar date element related to task completion from a natural language input and an associated surfacing of that identification via a task completion application. A task completion application is running and currently open on mobile computing device 300. In this example, the user has navigated to a "Home To-Dos" page of the task-completion application, where there are two to-dos/tasks that have previously been added to the "Home To-Dos" list. The previously-added to-dos are "Oil top of windows and doors" and "Call doctor". The call doctor to-do is indicated as being important by the star on the right side of that to-do element. The call doctor to-do also has a reminder set for it of Monday, June 25.

A user of the to-do application has initiated the entry of a new home to-do as indicated by new to-do element 302. Specifically, the user has typed the following text/natural language input into new to-do element 302: "Buy winter tires for next Saturday today at 9:00 please!" Because this text is input directly into the task completion application there is no need to perform coarse natural language processing on the input to determine whether it includes a task. Rather, the input can be directly processed with more fine-grained natural language processing to identify various attributes associated with the task (e.g., who, what, when, where, why, how). In this example, the natural language processing identifies "next Saturday" as relating to a "when" and the task completion application surfaces selectable icon 306 which the user may select to add a task event due date for the new task on the date corresponding to next Saturday (i.e., Saturday, August 4). Additional attributes that may be identified from the natural language input are discussed in relation to FIG. 4 and FIG. 5 below.

Figure 4:
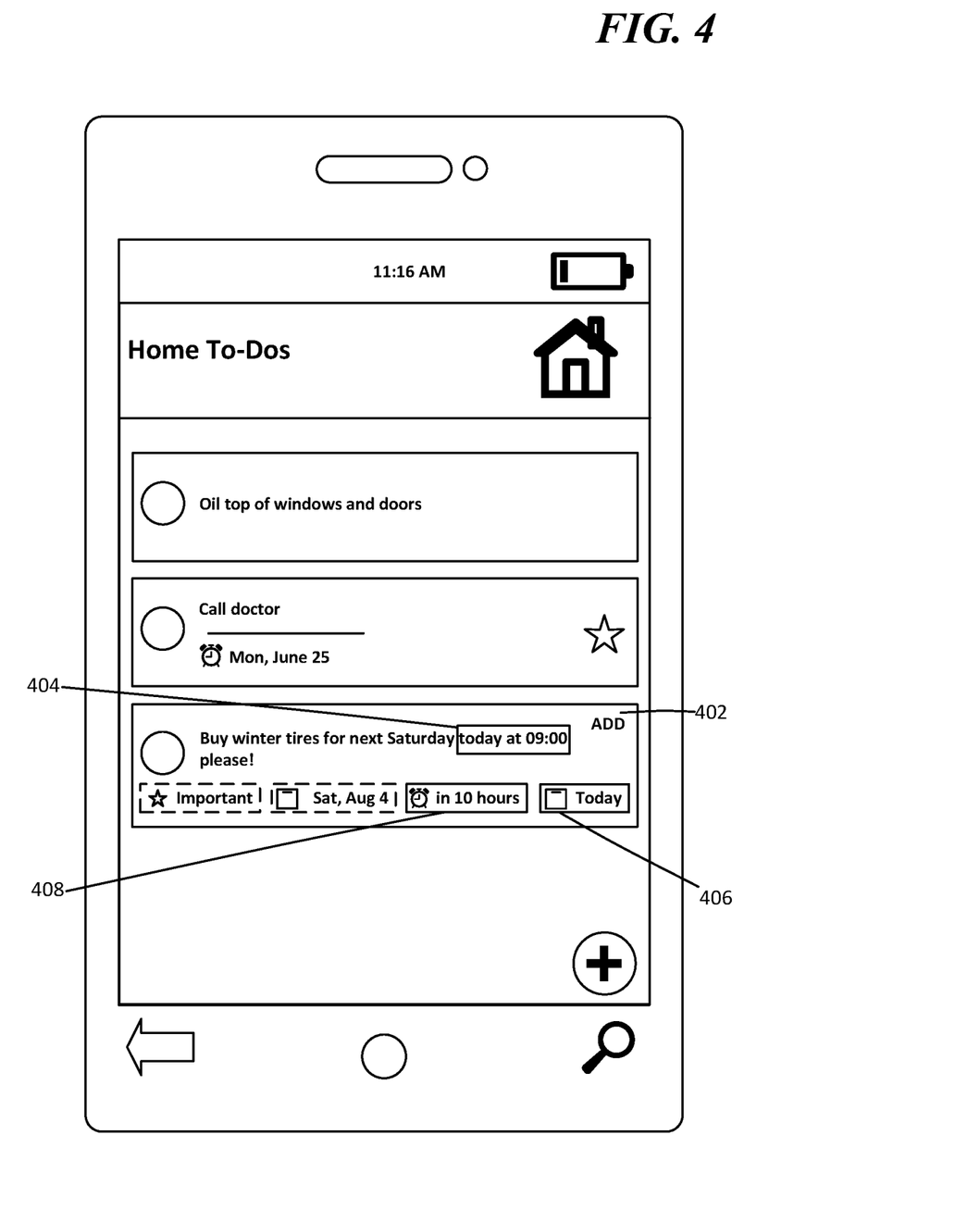
FIG. 4 illustrates the identification of a temporal element related to task completion from a natural language input and an associated surfacing of that identification via a task completion application.

FIG. 4 illustrates the identification of a temporal element related to task completion from a natural language input and an associated surfacing of that identification via a task completion application. As discussed above in relation to FIG. 3, a user has input the natural language input "Buy winter tires for next Saturday today at 9:00 please!" into new to-do element 402 in the task completion application. In this example, the natural language processing applied to the input further identifies "today at 9:00" as relating to "when" and the task completion application surfaces selectable icon 406 which the user may select to add a task event due date for the new task on the date corresponding to that time element (i.e., "today"). Additionally, because the natural language processing applied to the input has also identified a specific time on the date, the task completion application also surfaces selectable icon 408, which if selected will set an alarm/reminder for 9:00 on the date identified (today).

Figure 5:
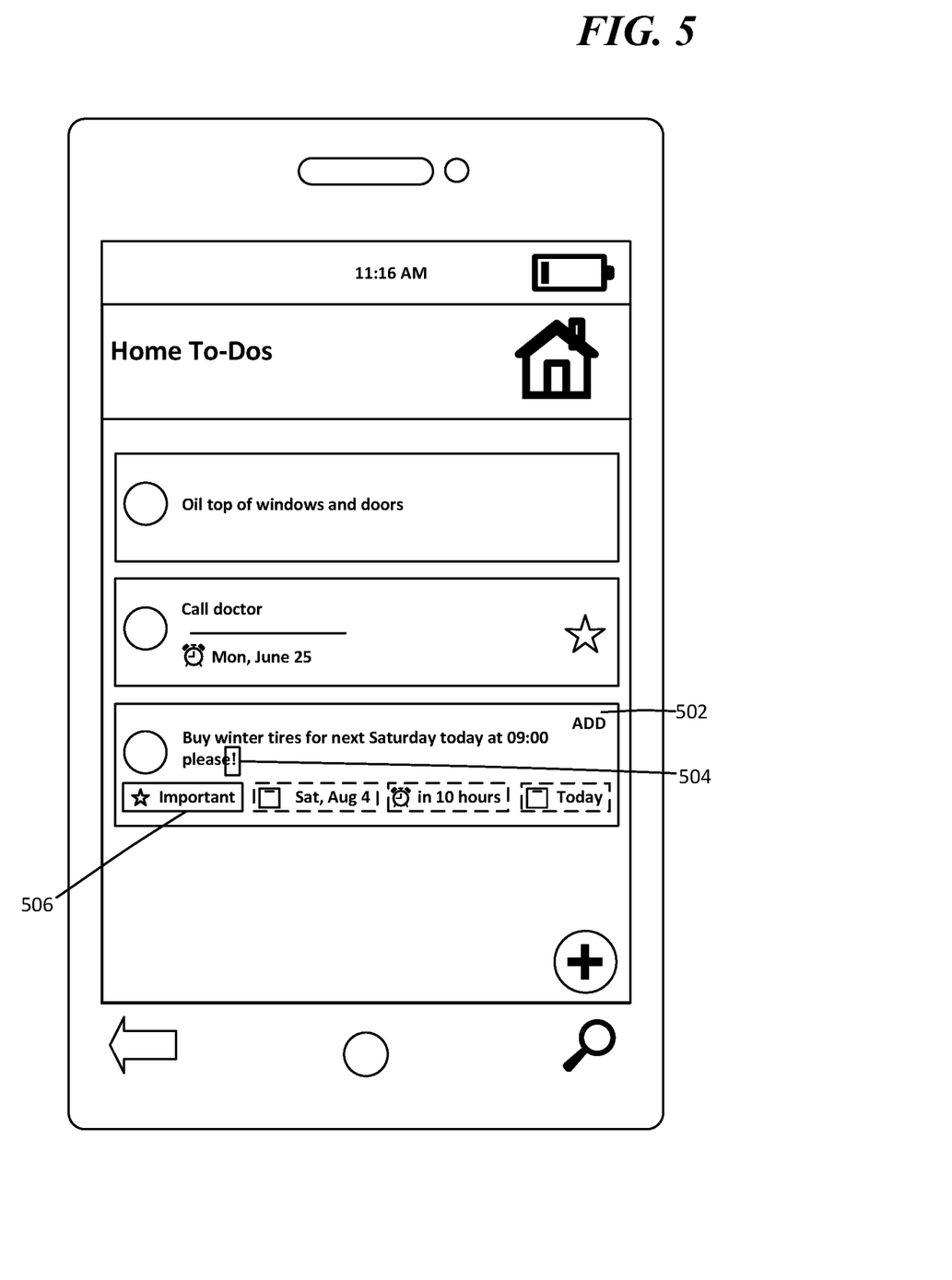
FIG. 5 illustrates the identification of user importance in relation to a natural language input and an associated surfacing of that identification via a task completion application in a manner that is native to the task completion application.

FIG. 5 illustrates the identification of user importance in relation to a natural language input and an associated surfacing of that identification via a task completion application in a manner that is native to the task completion application. As discussed above in relation to FIG. 3 and FIG. 4, a user has input the natural language input "Buy winter tires for next Saturday today at 9:00 please!" into new to-do element 502 in the task completion application. In this example, a machine learning model applied to the natural language input has identified that this user indicates that tasks should be marked as important when the user adds an exclamation point to the end of a task sentence. Thus, the task completion application identifies exclamation point 504 as potentially being important to the user and surfaces selectable icon 506 which the user may select to mark the new task as important in the task completion application. In some examples, marking the task as important may move the task to the top of the lists in the home to-dos, result in more frequent reminders for completing the task, result in the task being surfaced in a more conspicuous manner (e.g., surfacing on the home screen, including a sound and/or haptic reminder, etc.).

Figure 6:
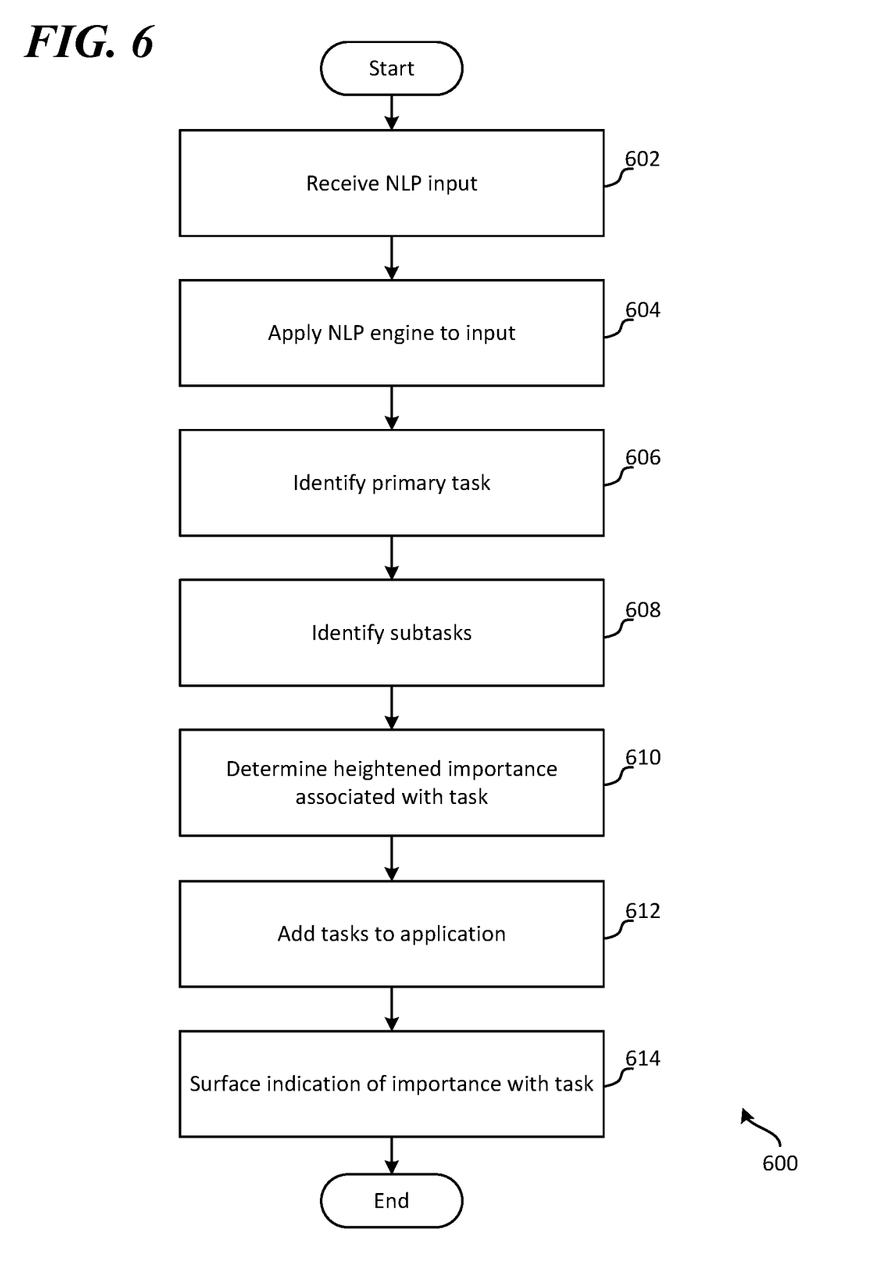
FIG. 6 is an exemplary method for assisting with task completion.

FIG. 6 is an exemplary method 600 for assisting with task completion. The method 600 begins at a start operation and flow moves to operation 602.

At operation 602 a text-based natural language input is received. The text-based natural language input may be received by a task completion application and/or a task completion service associated with a task completion application. In some examples, the natural language input may be received as a direct input to the task completion application (e.g., a user types the natural language input directly into the task completion application, a user narrates the natural language input for transcription directly into the task completion application). In other examples, the natural language input may be received from a separate application and/or operating system feature (e.g., a text messaging application, a notes application, an email application, a digital assistant, etc.).

From operation 602 flow continues to operation 604 where a natural language processing engine is applied to the natural language input. The natural language processing engine may be comprised of one or more layers and one or more processing models. In some examples, the natural language processing engine may comprise a coarse processing layer where one or more relatively inexpensive processing models are applied to the natural language input to determine whether it includes a task and/or task intent. In additional examples, the natural language processing engine may comprise a fine-grained processing layer where one or more relatively more expensive processing models are applied to identify attributes of the natural language input in relation to a task and/or task intent (e.g., what users are associated with the task, how is the task to be completed, does the task include subtasks, what are the subtasks, when is the task to be completed, when is the task to be started, etc.). In some examples, applying the natural language processing engine to the natural language input may comprise applying at least one of the following to the natural language input: topic detection using clustering, hidden Markov models, maximum entropy Markov models, support vector machine models, decision tree models, deep neural network models, general sequence-to-sequence models (e.g., conditional probability recurrent neural networks, transformer networks), generative models, recurrent neural networks for feature extractors (e.g., long short-term memory models, GRU models), deep neural network models for word-by-word classification, and latent variable graphical models.

From operation 604 flow continues to operation 606 where a primary task associated with the natural language input is identified from the natural language input. As described above, the primary task may be identified based on the application of a coarse processing model. In other examples, the primary task may be automatically identified based on the natural language input being received directly from the user by the task completion application.

From operation 606 flow continues to operation 608 where a plurality of subtasks for completing the primary task are identified from the natural language input. In some examples, the plurality of subtasks may be identified by first identifying that the natural language input includes a string separated by one or more delimiters. In additional examples, the plurality of subtasks may be identified by first identifying that the natural language input includes a list (e.g., a numbered list, a lettered list, a bulleted list).

From operation 608 flow continues to operation 610 where it is determined from the natural language input that the primary task or one of the plurality of subtasks has a higher degree of importance associated with it than each other identified task or subtask. In some examples this determination may be made via application of a machine learning model to one or more elements of the natural language input. In some examples, the machine learning model may identify based on past user input that the user that input the natural language input associates higher importance with tasks that have certain indications associated with them (e.g., the user associates higher importance with tasks that have an exclamation point at the end of them, a user associates higher importance with tasks that she has underlined, a user associates higher importance with tasks that she has bolded, a user associates higher importance with tasks that she has included in italics, etc.).

From operation 610 flow continues to operation 612 where the primary task and the plurality of subtasks are added to a list of tasks in a task completion application. In some examples, the tasks may be categorized in the task completion application by type (e.g., work type, home type, personal type, etc.). The type may have been identified based on one of the natural language processing models applied to the natural language input as discussed above.

From operation 612 flow continues to operation 614 where an indication of importance is surfaced in the task completion application in association with the task or subtask determined to have a higher degree of importance associated with it. In some examples, the indication of importance may be surfaced in a format that is native to the task completion application and that indication may be different from any indication included in the natural language input. For example, the task completion application may identify tasks and/or subtasks as important via a star icon next to each important task (i.e., the native format), and the indication included in the natural language input may be an underline of the important task or word in the important task, or an exclamation point at the end of an important task included in the natural language input.

From operation 614 flow continues to an end operation and the method 600 ends.

Figure 7:
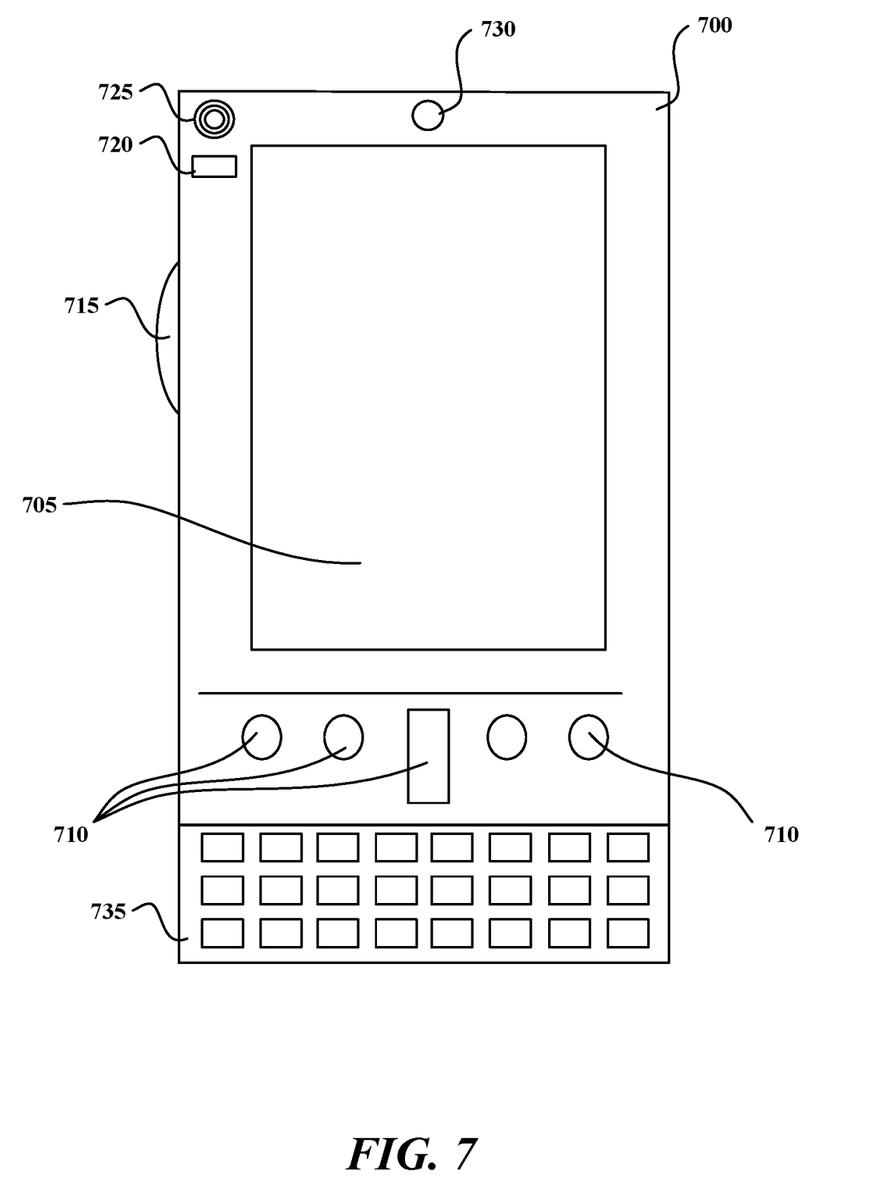
FIGS. 7 and 8 are simplified diagrams of a mobile computing device with which aspects of the disclosure may be practiced.
Figure 8:
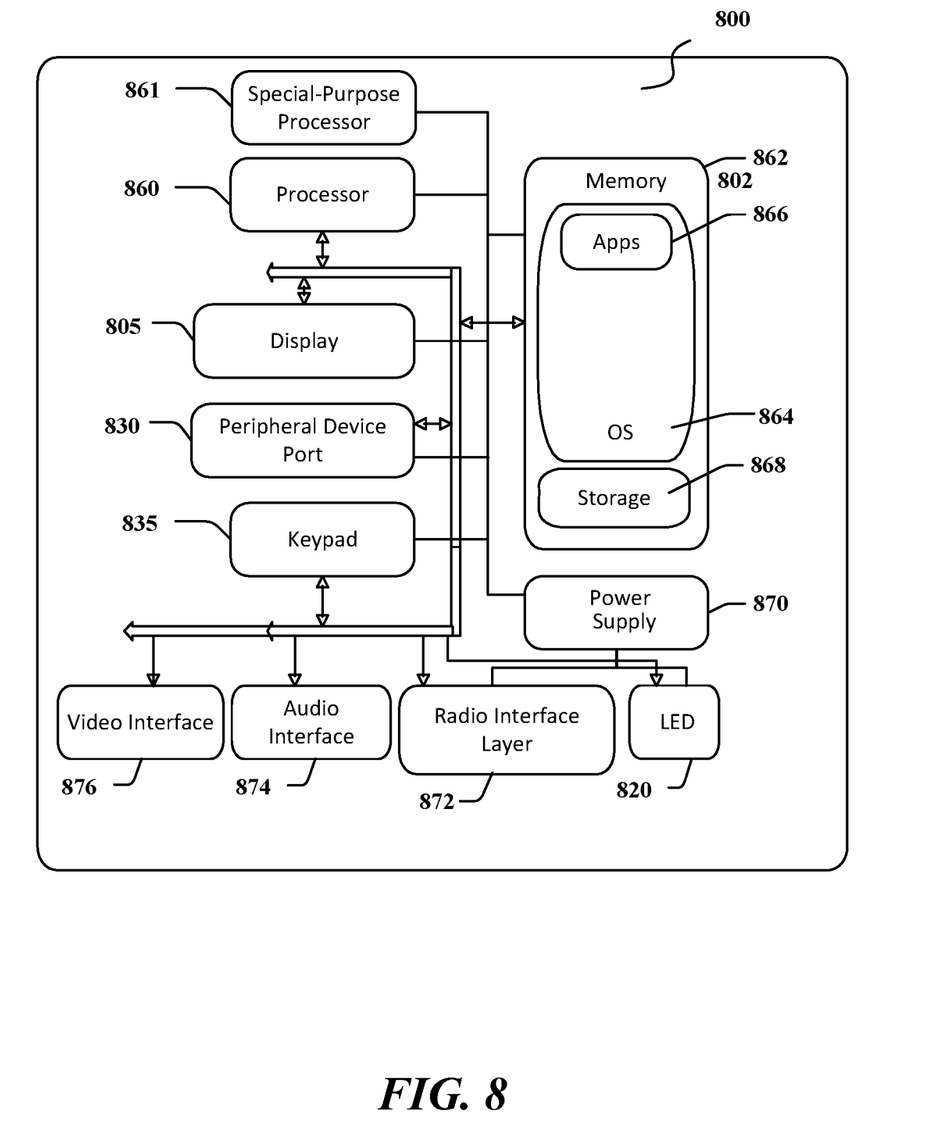

FIGS. 7 and 8 illustrate a mobile computing device 700, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 7, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or fewer input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 8 is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including instructions for providing and operating a to-do list application and/or a daily to-do list creation and/or augmentation service.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 720 may be used to provide visual notifications, and/or an audio interface 874 may be used for producing audible notifications via the audio transducer 725. In the illustrated embodiment, the visual indicator 720 is a light emitting diode (LED) and the audio transducer 725 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 725, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 730 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8 by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
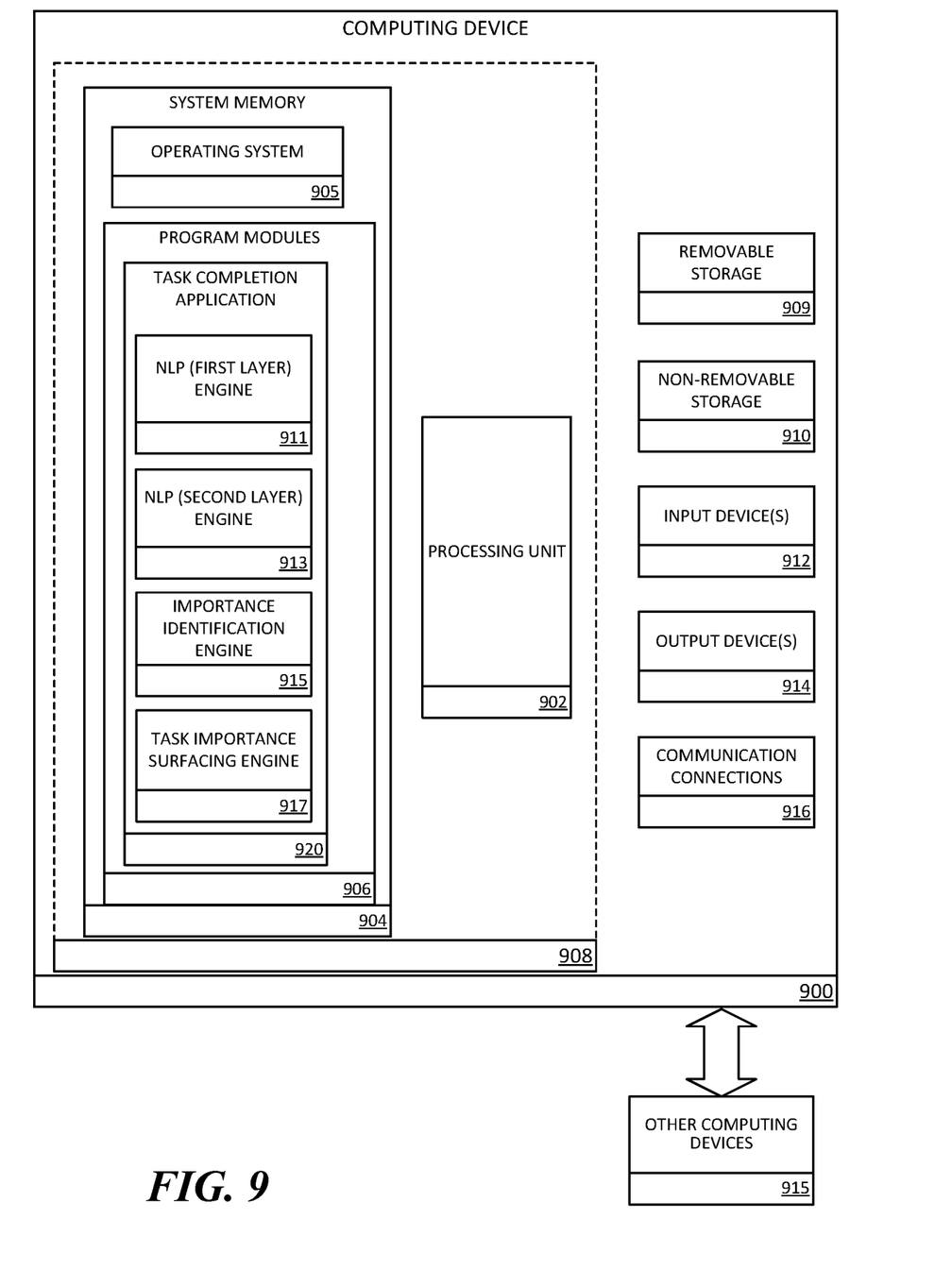
FIG. 9 is a block diagram illustrating example physical components of a computing device with which aspects of the disclosure may be practiced.

FIG. 9 is a block diagram illustrating physical components (e.g., hardware) of a computing device 900 with which aspects of the disclosure may be practiced. The computing device components described below may have computer executable instructions for assisting with task completion. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 suitable for running one or more to-do list programs. The operating system 905, for example, may be suitable for controlling the operation of the computing device 900. Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., task completion application 920) may perform processes including, but not limited to, the aspects, as described herein. According to examples, NLP (first layer) engine 911 may perform one or more operations associated with applying a relatively inexpensive (from a processing standpoint) natural language processing model to a message to identify whether that message includes a task or task intent. NLP (second layer) engine 913 may perform one or more operations associated with applying a relatively more expensive (from a processing standpoint) natural language processing model to a message that has been identified as including a task or task intent, to further identify one or more attributes associated with the task or task intent. Importance identification engine 915 may perform one or more operations associated with applying a machine learning model to a natural language input from a user and identifying whether characteristics of the input indicate a relatively higher level of importance related to an included task compared with other tasks and/or subtasks. Task importance surfacing engine 917 may perform one or more operations associated with indicating an importance level, in a task completion application, in association with important tasks that have been identified as important based on application of one or more machine learning models to a natural language input.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10:
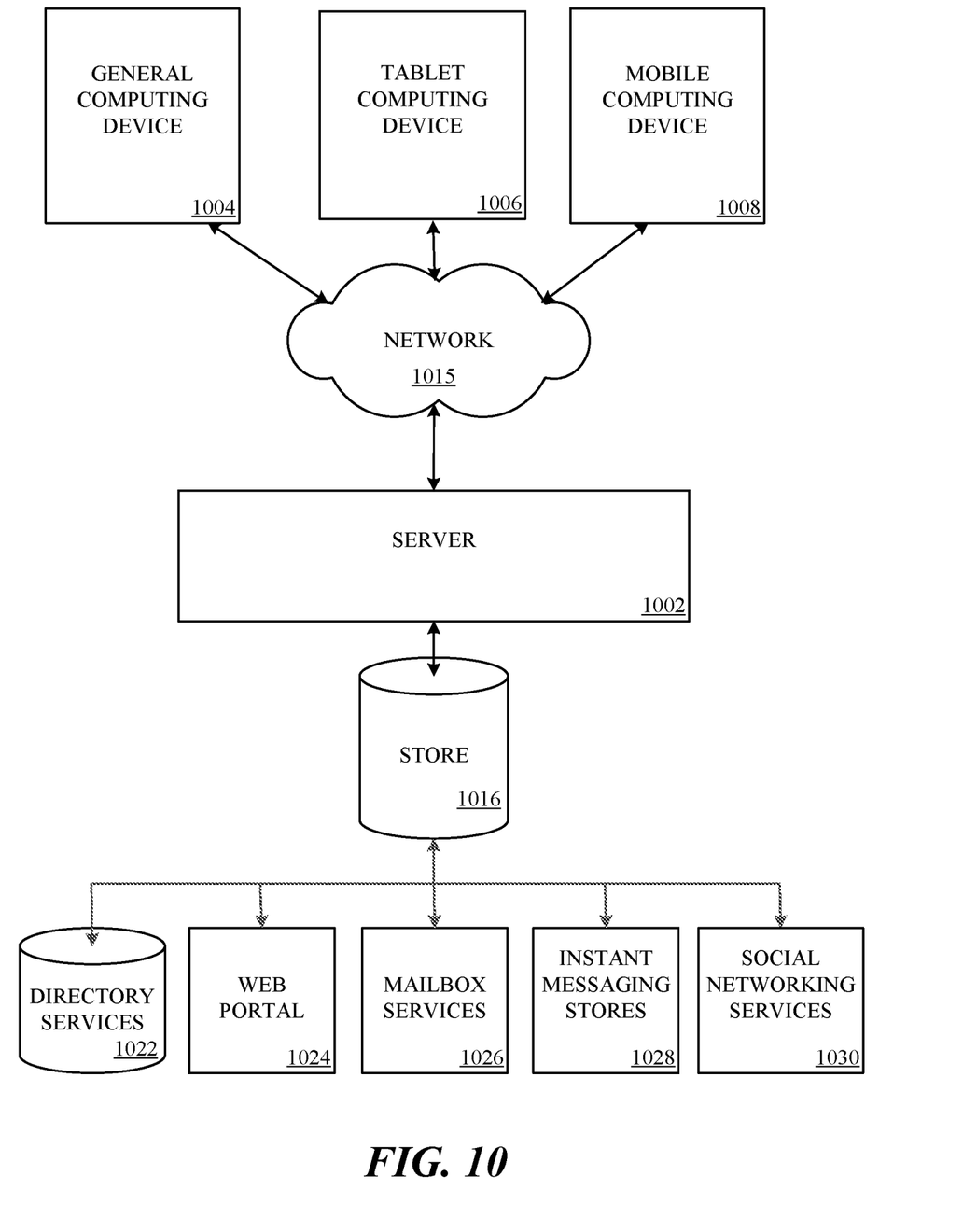
FIG. 10 is a simplified block diagram of a distributed computing system in which aspects of the present disclosure may be practiced.

FIG. 10 illustrates one aspect of the architecture of a system for processing data received at a computing system from a remote source, such as a personal/general computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. The program modules 906 may be employed by a client that communicates with server device 1002, and/or the program modules 906 may be employed by server device 1002. The server device 1002 may provide data to and from a client computing device such as a personal/general computer 1004, a tablet computing device 1006 and/or a mobile computing device 1008 (e.g., a smart phone) through a network 1015. By way of example, the computer system described above with respect to FIGS. 7-9 may be embodied in a personal/general computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for assisting with task completion, the method comprising:
   receiving a text-based natural language input;
   applying a coarse natural language processing engine to the natural language input, the coarse natural language processing engine having a first processing cost to process the natural language input;

identifying based on application of the coarse natural language processing engine, from the natural language input, a primary task associated with the natural language input;

applying a fine natural language processing engine to the natural language input, the fine natural language processing engine having a second processing cost to process the natural language input that is higher than the first processing cost;

identifying based on application of the fine natural language processing engine, from the natural language input, one or more users that are responsible for completing the primary task, and a due date associated with the primary task;

determining that the natural language input includes a string separated by one or more delimiters, or a list;

identifying based on the determination that the natural language input includes a string separated by one or more delimiters, or a list, a plurality of subtasks for completing the primary task;

determining, from the natural language input, that the primary task or one of the plurality of subtasks has a higher degree of importance associated with it than each other identified task or subtask;

adding the primary task and the plurality of subtasks to a list of tasks in a task completion application; and surfacing, in the task completion application, an indication of importance in association with the task or subtask determined to have a higher degree of importance associated with it.

2. The method of claim 1, wherein the task or subtask that is determined to have a higher degree of importance associated with it is surfaced, in the task completion application, above each other identified subtask.

3. The method of claim 1, wherein applying the coarse natural language processing engine to the natural language input comprises applying a hierarchical attention model to the natural language input, and applying the fine natural language processing engine to the natural language input comprises applying a conditional random field model to the natural language input.

4. The method of claim 1, wherein identifying a primary task associated with the natural language input further comprises identifying a date for completing an event included in the natural language input.

5. The method of claim 1, wherein the natural language input is received by the task completion application from one of: an email application, an instant messaging application, and a digital assistant service.

6. The method of claim 1, wherein the indication of importance surfaced in association with the task or subtask determined to have a higher degree of importance associated with it is in a format native to the task completion application, and that indication is different from any indication included in the natural language input.

7. The method of claim 1, wherein determining that the primary task or one of the plurality of subtasks has a higher degree of importance associated with it comprises applying a machine learning model to a plurality of natural language inputs from a user that generated the natural language input.

8. A system for assisting with task completion, comprising:

a memory for storing executable program code; and one or more processors, functionally coupled to the memory, the one or more processors being responsive to computer-executable instructions contained in the program code and operative to:

receive a text-based natural language input;

apply a coarse natural language processing engine to the natural language input the coarse natural language processing engine having a first processing cost to process the natural language input;

identify based on application of the coarse natural language processing engine, from the natural language input, a primary task associated with the natural language input;

apply a fine natural language processing engine to the natural language input, the fine natural language processing engine having a second processing cost to process the natural language input that is higher than the first processing cost;

identify based on application of the fine natural language processing engine, from the natural language input, one or more users that are responsible for completing the primary task, and a due date associated with the primary task;

determine that the natural language input includes a string separated by one or more delimiters, or a list;

identify based on the determination that the natural language input includes a string separated by one or more delimiters, or a list a plurality of subtasks for completing the primary task;

determine, from the natural language input, that the primary task or one of the plurality of subtasks has a higher degree of importance associated with it than each other identified task or subtask;

add the primary task and the plurality of subtasks to a list of tasks in a task completion application; and surface, in the task completion application, an indication of importance in association with the task or subtask determined to have a higher degree of importance with it.

9. The system of claim 8, wherein the one or more processors are further responsive to the computer-executable instructions contained in the program code and operative to:

surface the task or subtask that is determined to have a higher degree of importance associated with it above each other identified subtask in the task completion application.

10. The system of claim 8, wherein in applying the coarse natural language processing engine to the natural language input, the one or more processors are further responsive to the computer-executable instructions contained in the program code and operative to:

apply a hierarchical attention model to the natural language input.

11. The system of claim 8, wherein in identifying a primary task associated with the natural language input, the one or more processors are further responsive to the computer-executable instructions contained in the program code and operative to:

identify a date for completing an event included in the natural language input.

12. The system of claim 8, wherein the indication of importance surfaced in association with the task or subtask determined to have a higher degree of importance associated with it is in a format native to the task completion application, and that indication is different from any indication included in the natural language input.

13. The system of claim 8, wherein in determining that the primary task or one of the plurality of subtasks has a higher degree of importance associated with it, the one or more processors are further responsive to the computer-executable instructions contained in the program code and operative to:
apply a machine learning model to a plurality of natural language inputs from a user that generated the natural language input.

14. A computer-readable storage device comprising executable instructions that, when executed by one or more processors, assists with task completion, the computer-readable storage device including instructions executable by the one or more processors for:

receiving a text-based natural language input;

applying a coarse natural language processing engine to the natural language input, the coarse natural language processing engine having a first processing cost to process the natural language input;

identifying based on application of the coarse natural language processing engine, from the natural language input, a primary task associated with the natural language input;

applying a fine natural language processing engine to the natural language input, the fine natural language processing engine having a second processing cost to process the natural language input that is higher than the first processing cost;

identifying based on application of the fine natural language processing engine, from the natural language input, one or more users that are responsible for completing the primary task, and a due date associated with the primary task;

determining that the natural language input includes a string separated by one or more delimiters, or a list;

identifying based on the determination that the natural language input includes a string separated by one or more delimiters, or a list, a plurality of subtasks for completing the primary task;

determining, from the natural language input, that the primary task or one of the plurality of subtasks has a higher degree of importance associated with it than each other identified task or subtask;

adding the primary task and the plurality of subtasks to a list of tasks in a task completion application; and surfacing, in the task completion application, an indication of importance in association with the task or subtask determined to have a higher degree of importance with it.

15. The computer-readable storage device of claim 14, the instructions are further executable by the one or more processors for:

surfacing the task or subtask that is determined to have a higher degree of importance associated with it above each other identified subtask in the task completion application.

16. The computer-readable storage device of claim 14, wherein the indication of importance surfaced in association with the task or subtask determined to have a higher degree of importance associated with it is surfaced in a format native to the task completion application, and that indication is different from any indication included in the natural language input.

17. The computer-readable storage device of claim 14, wherein in determining that the primary task or one of the plurality of subtasks has a higher degree of importance associated with it, the instructions are further executable by the one or more processors for:

applying a machine learning model to a plurality of natural language inputs from a user that generated the natural language input to determine a pattern associated with highlighting the importance of a plurality of tasks.

\* \* \* \* \*